H. B. KRAUT.
COMBINATION COPING AND NOTCHING MACHINE.
APPLICATION FILED MAR. 4, 1919.

1,389,878.

Patented Sept. 6, 1921.
4 SHEETS—SHEET 1.

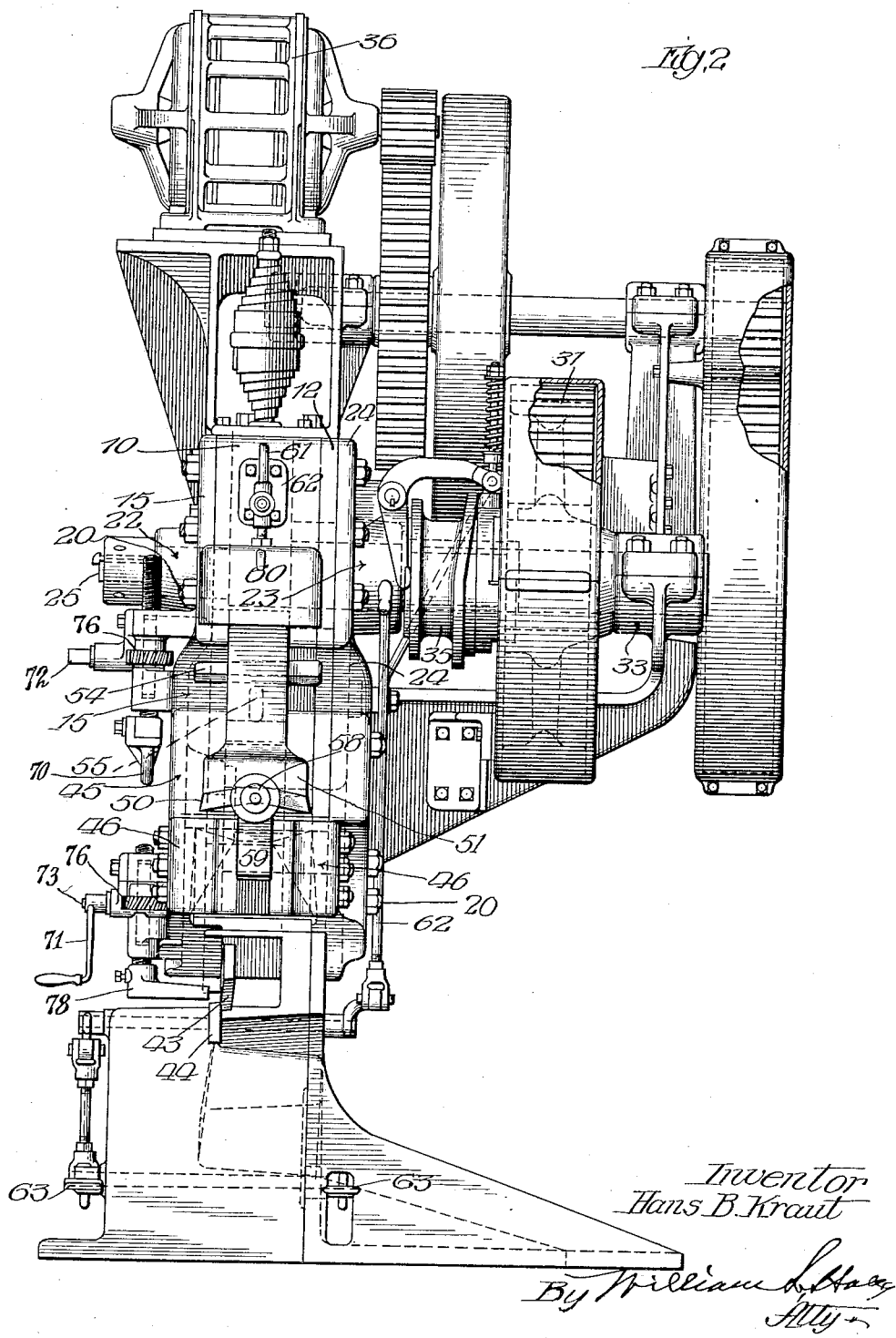

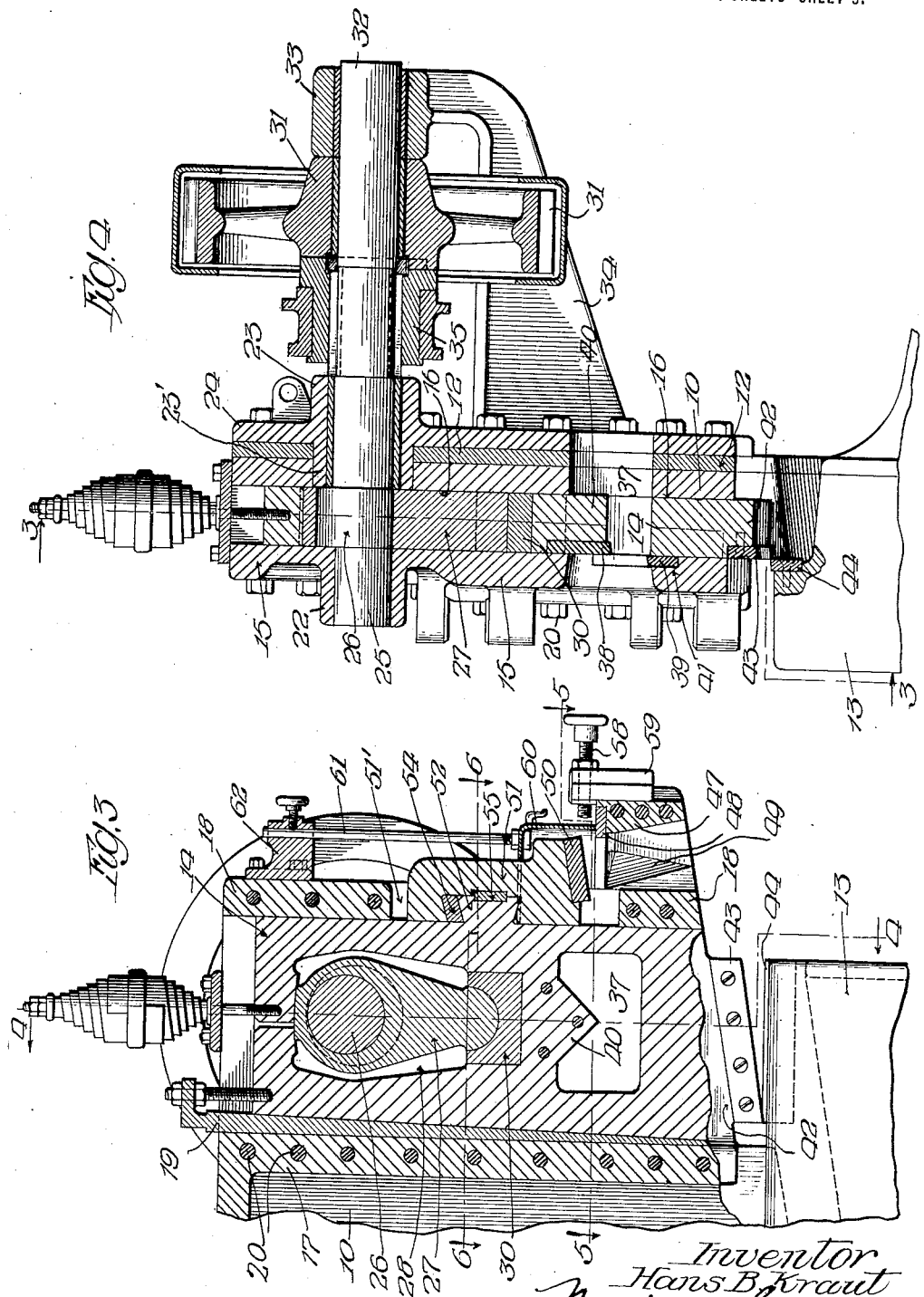

H. B. KRAUT.
COMBINATION COPING AND NOTCHING MACHINE.
APPLICATION FILED MAR. 4, 1919.
1,389,878.
Patented Sept. 6, 1921.
4 SHEETS—SHEET 4.
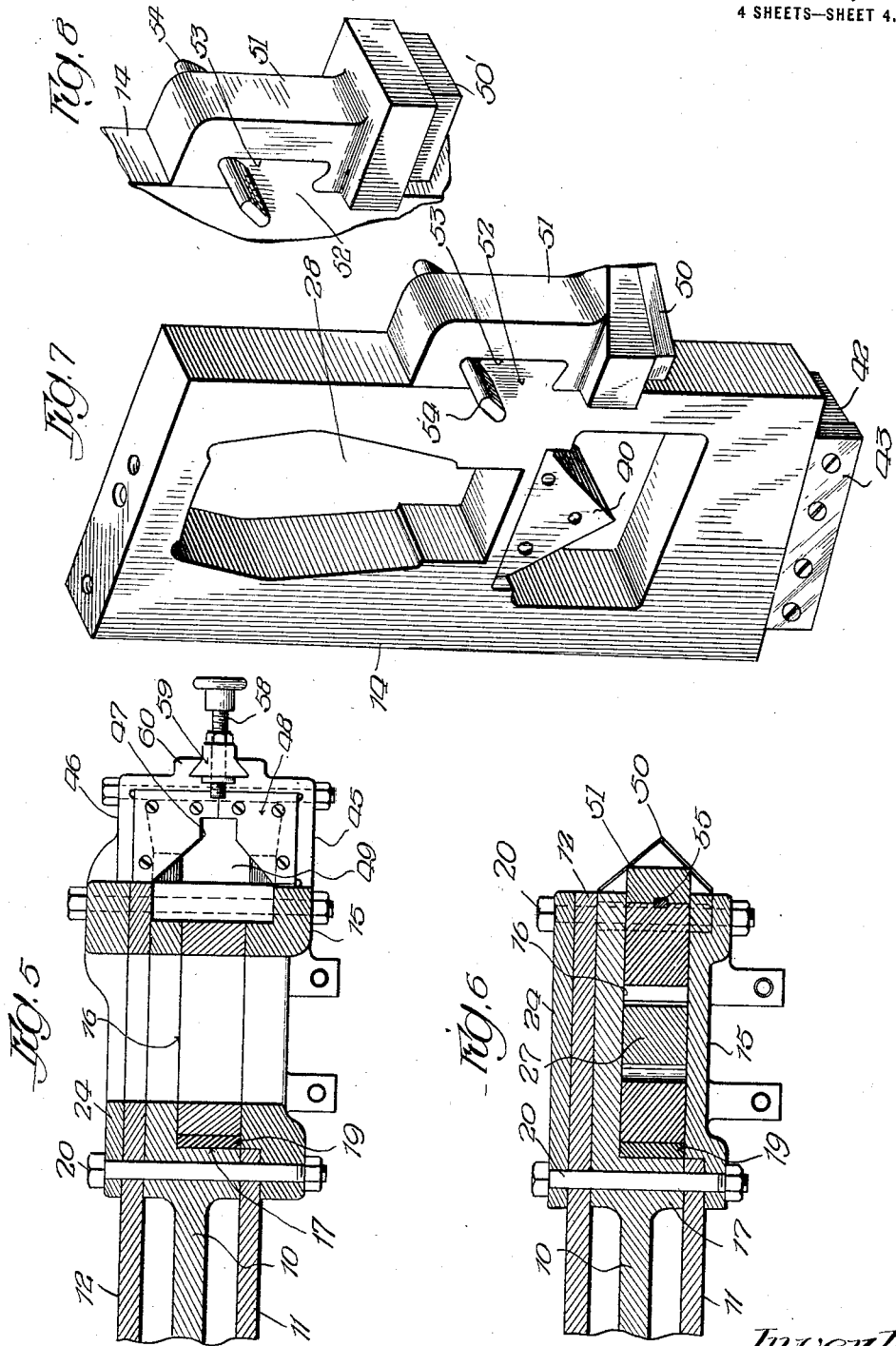

UNITED STATES PATENT OFFICE.

HANS B. KRAUT, OF CHICAGO, ILLINOIS.

COMBINATION COPING AND NOTCHING MACHINE.

1,389,878.  Specification of Letters Patent.  Patented Sept. 6, 1921.

Application filed March 4, 1919. Serial No. 280,612.

*To all whom it may concern:*

Be it known that I, HANS B. KRAUT, a citizen of the United States, and a resident of Chicago, in the county of Cook and State of Illinois, have invented certain new and useful Improvements in Combination Coping and Notching Machines; and I do hereby declare that the following is a full, clear, and exact description thereof, reference being had to the accompanying drawings, and to the characters of reference marked thereon, which form a part of this specification.

This invention relates to a novel metal working machine and refers more specifically to an improved notching and coping mechanism for such machines and to a frame for supporting the same, and relates also to a machine combining a coping and notching mechanism with other metal cutting mechanisms.

One of the purposes of the invention is to produce in a machine of this character a combination of the frame elements and operative elements of the machine arranged to give support to the projecting bolster of the coping and notching mechanism, the construction of the frame and its relation to the operative parts of the machine being such as to distribute the operating stresses brought on the projecting bolster supporting portion of the frame throughout the frame structure and on the operative parts of the machine in such a way as to enormously strengthen the bolster support and prevent distortion or springing thereof under the shocks due to the forcing of the cutting blade through the work.

A further object of the invention is to provide a novel coping and notching tool holder for machines of this character and novel means for supporting the same on and locking it to the operating slide so that said holder may be fixedly locked in place by means which permit ready removal of the holder from and its replacement on the slide to thereby permit quick change of holders carrying different shaped cutting blades.

A further object of the invention is to produce a simple and compact combined machine in which a single slide is arranged to operate the notching and coping mechanism, and other metal cutting and working mechanisms.

Other objects of the invention are to improve and simplify metal cutting machines of this character, and the invention consists in the combination and arrangement of the parts shown in the drawings and described in the specification, and is pointed out in the appended claims.

In the drawings;

Fig. 2 is an end elevation thereof.

Fig. 3 is a vertical section on the line 3—3 of Fig. 4.

Fig. 4 is a vertical section on the line 4—4 of Fig. 3, and also on line 4—4 of Fig. 1.

Figure 1:
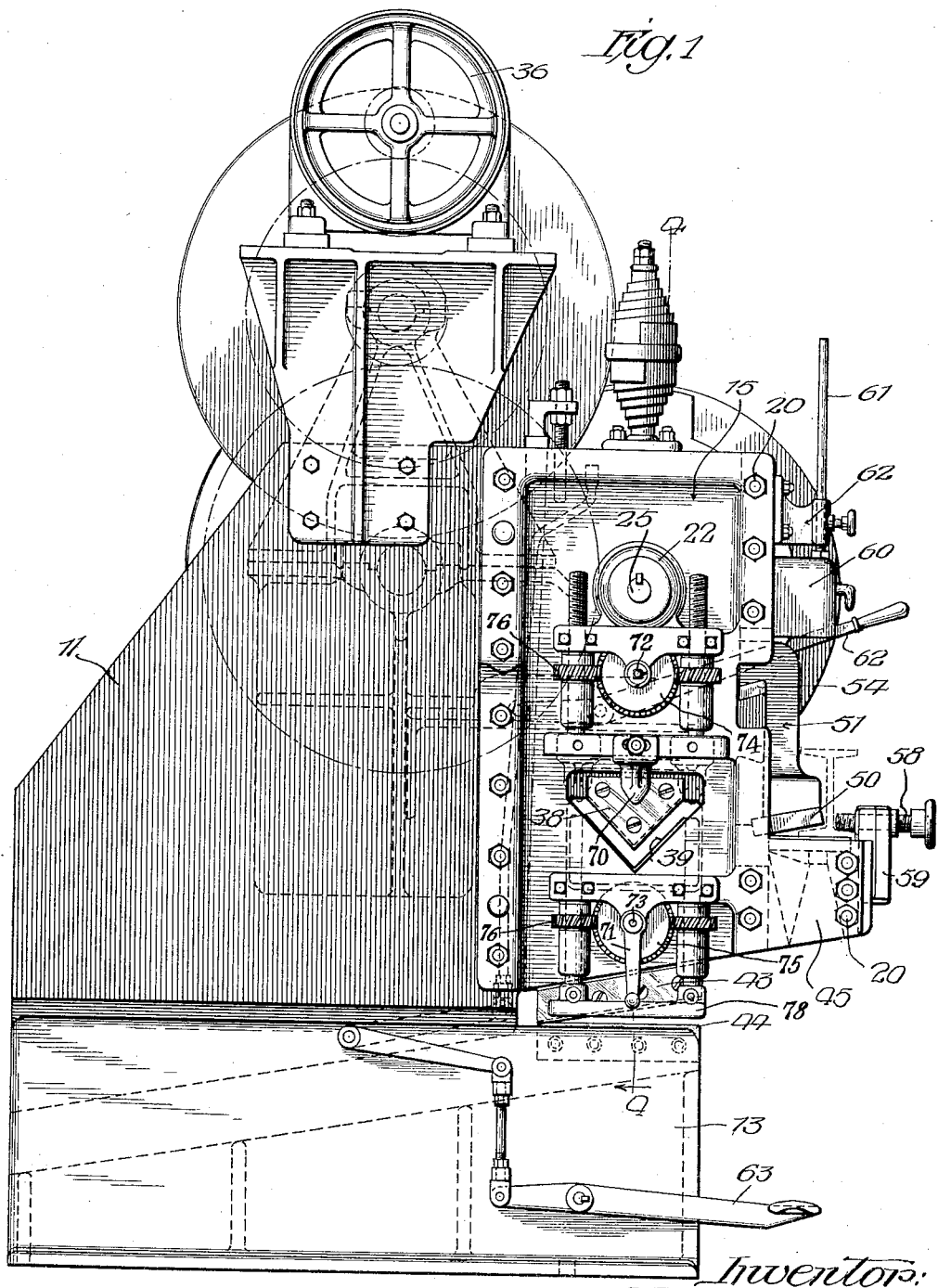
Figure 1 is a side elevation of a machine embodying my invention.

Figs. 5 and 6 are horizontal sections on the respective lines 5—5 and 6—6 of Fig. 3.

Fig. 7 is a perspective view of the tool operating slide.

Fig. 8 is a perspective view of a holder for a square or notching blade.

The frame of the machine is a composite structure like that illustrated in my companion application for United States Letters Patent filed on the fourth day of March, 1919, Serial Number 280,613. It comprises an intermediate flanged or skeleton cast metal member 10 and side plates 11, 12 which are pinned to the intermediate member, the intermediate member being recessed or flanged to provide a vertical guide or way in which reciprocates a tool operating slide 14 of general rectangular form, shown best in Figs. 3 and 7. The plate 11 is cut away opposite said guide or way and a cover plate 15 is applied over the opening of said plate 11 to form one side of the guide or way, the other side of which is formed by the flat face 16 of the intermediate frame member 10, as best shown in Figs. 5 and 6. The edges of said slide are guided by flanges 17, 18 of the intermediate member, the flange 18 being interrupted intermediate its ends to provide vertical cleanance for the movement of the coping and notching tool holder. An adjusting gib 19 between one edge of the tool operating slide and the associated wall of the slide compensates for wear between the slide and frame. Said cover plate 15 is fastened to the structure by bolts 20 which extend through the side plates and the intermediate member of the frame. The said cover plate 15 is formed with an integral or solid bearing 22 which is alined with a bearing 23 formed integral with a third plate 24 that is applied to one side of the frame over the plate 12 and is fastened thereto by the bolts 20. The bearing 23 has an integral inward extension that fits tight in openings in the plate 12 and intermediate member 10 and takes shearing stresses between said parts.

Rotatively mounted in said bearings 22, 23 is a slide operating shaft 25 that is provided with an eccentric 26 which is rotated within and operates in connection with a massive pitman 27 located in an elongated opening 28 of the slide. Said pitman is rounded at its lower end to bear against a block 30 which is seated in a squared recess at the lower side of said opening 28. Said shaft 25 is adapted to be clutched to a gear wheel 31 which rotates on a shaft 32 in alinement with the shaft 25 and is mounted in a bearing 33 carried by the outer end of a bracket arm 34 fixed to and extending laterally from the frame; the clutch being controlled by a slidable clutch collar 35 on the shaft 25. The said gear wheel 31 is driven from a motor 36 supported on the frame through a train of gears shown in Figs. 1 and 2.

The frame members 10, 11, 12, and 24 and also the slide 14, are cut away to provide a transverse clearance opening 37 through the machine for sections that are cut by movable and fixed section cutting blades 38, 39 (Fig. 3) fixed respectively to supports 40, 41 on the slide and the cover plate 15. The lower end of the slide 14 is formed with an oblique seat 42 to support the movable blade 43 of a shearing mechanism, said blade coöperating with a horizontal fixed blade 44 that is supported on a seat formed in the base 13 of the machine frame.

The cover plate 15 at one side of the frame and the plate 24 at the other side of the frame (Figs. 5 and 6) are provided with extensions 45, 46, respectively, that project beyond the vertical line of the frame at the front or coping and notching end of the machine to constitute a bolster support 47 which supports the lower fixed blade 48 of the coping and notching mechanism, and are fixed together by the bolts 20.

As herein shown, said bolster comprises two laterally disposed symmetrical parts made integral with said extensions that are formed with flat upper faces to support the two part fixed coping and notching blade 48. Said blade 48 is secured to the bolster by screws and is joined along the meeting lines of the extensions that form the bolster. The bolster is cut away in rear of the shearing edges of the blade to provide a clearance opening 49 which opens through the lower side of the bolster (Figs. 3 and 5).

The upper coping or notching blade is fixed to an oblique seat formed on the lower face of an overhanging blade holder 51 which is removably supported on the forward edge of the slide 14 and projects through a clearance space 51' that is formed between the interrupted front flanges 18 at the forward end of the frame. In Fig. 7 the holder 51 is adapted to support a coping blade, while it is shown in Fig. 8 as adapted to support a notching blade 50'. The connection between the slide and blade holder 51 comprises a dove-tail projection 52 integral with and extending forwardly from the slide which enters an undercut notch 53 on the rear face of the blade holder 51, the said notch 53 being of a length sufficiently greater than the vertical height of the dove-tail projection 52 that the acute lips of the blade holder at the ends of the undercut notch may pass over the acutely angled upper and lower edges of the dove-tail projection by applying the holder directly to the forward face of the slide, and in like manner may be removed. The holder is locked from withdrawal directly away from the slide by means of a locking bar 54 adapted to fit between the upper oblique face of the dove-tail projection 52 and the corresponding upper wall of the undercut recess of the blade holder (Figs. 3 and 7). The said blade holder is held laterally fixed on the dove-tail projection by means of a short vertical key 55 (Figs. 3 and 6), which occupies opposed or registering vertical grooves in the adjacent walls of the holder and projection. The said key 55 may be fitted to one of the grooves so as to remain therein and adapted to more loosely engage the other groove to prevent complete detachment of the key from both parts. To fit the blade holder in place it is applied with its recessed face directly toward the projection 52 and the key 55 coöperates with the grooves in the blade holder and projection to fix the holder from lateral displacement. Thereafter the locking bar 54 is inserted between the holder and projection to lock the holder from vertical displacement. To remove the holder the locking bar is released, whereupon the holder may be withdrawn directly away from the slide.

The work is held in position on the bolster by means of a gage screw 58 that is threaded through a block 59 which has dove-tail connection with lugs 60 on the bolster support exterior to the bolster. Adjustable hold-down and stripper devices are associated with the section cutter and with the shearing blades, as shown in Figs. 1 and 2, at 70 and 78, which may be raised and lowered by a wrench 71 applied to the squared ends of the shafts 72, and 73 to actuate the gears 74, 75 which mesh with the pinions 76. Inasmuch as these devices constitute no part of the present invention they need not be further described. It may be stated here, however, that a bar cutter device, such as is shown in my aforesaid companion application may be associated with the slide in lieu of the section cutter shown. For purpose of clearness of illustration, the said hold-down and stripper devices are omitted from Fig. 4 of the drawings.

An important advantage of the construction described, in respect of the matter of supporting the coping and notching bolster on the frame, lies in the arrangement of the overlapping plates 15 and 24 relatively to the frame that are bolted or otherwise rigidly fixed to the opposite sides of the frame, and whose bolster supporting extensions 45, 46 project beyond the vertical line of the frame. This construction and arrangement distributes the operating stresses of the coping and notching mechanism well back on the machine frame where the supporting plates therefor, which are parallel with the frame members, may be fixedly attached to the frame, as by the bolts 20 of ample strength. It will thus be seen that the operating stresses are transmitted uniformly to all of the elements of the frame structure, and are in the direction of the planes of said elements, as well as of the planes of the plates 15 and 24 themselves. Said plates 15 and 24 are thickened at the front of the machine to further strengthen the structure.

In addition to the strength imparted to the bolster support by the plates, it will be observed that said construction is further strengthened by reason of the fact that the plates 15 and 24 carry the bearings 22 and 23 for the slide operating shaft 25, so that bearing extension 23′ becomes an element in transmitting the operating stresses from the bolster carrying plates 15 and 24 to the frame and through parts of the frame which may be made sufficiently massive to withstand the stresses.

When the coping and notching mechanism is not in use the movable blade 50 and its holder may be covered and protected by a guard hood 60 that is supported on the lower end of an upright rod 61 which slides through and is adapted to be adjustably locked in a lug 62 that projects forwardly from the skeleton member of the frame.

The movable member or collar 35 of the clutch by which the slide operating shaft 25 is connected to and disconnected from power is connected by movable links and levers with hand and foot levers 62, 63 that are arranged for convenient access to the position of an operator when directing the work to the machine.

I claim as my invention:

1. In a machine for the purpose set forth, a frame embracing side plates that overlap rearwardly on the frame and are provided with overhanging integral extensions to constitute a bolster support for a coping and notching mechanism, a reciprocating slide in said frame carrying an overhanging coping and notching blade holder, coöperating with said mechanism, an operating shaft for said slide, and bearings on said plates for said shaft.

2. In a machine for the purpose set forth, a frame embracing side plates that overlap rearwardly on the frame and are provided with overhanging integral extensions to constitute a bolster support for a coping and notching mechanism, a reciprocating slide in said frame carrying an overhanging coping and notching blade holder coöperating with said mechanism, an operating shaft for said slide, and bearings integral with said plates in which said shaft is mounted for rotation.

3. In a machine for the purpose set forth, a frame embracing side plates that overlap rearwardly on the frame and are provided with overhanging integral extensions formed with integral end portions that are brought together to constitute a bolster to support a fixed blade of a coping and notching mechanism, a reciprocable slide in said frame to carry an overhanging movable coping and notching blade holder coöperating with said fixed blade, a slide operating shaft, and bearings for said shaft integral with said plates and one of the bearings transmitting shearing stress between the frame member and its side plate.

4. A machine for the purpose set forth comprising a frame embracing an intermediate member flanged to provide a way for a tool operating slide, a slide reciprocable in said way, a movable coping and notching blade holder carried by said slide, and plates fixed rigidly to and rearwardly overlapping the opposite sides of said flanged member and rigidly secured thereto, said plates being provided with overhanging integral supports forming a coping and notching bolster.

5. A machine for the purpose set forth comprising a frame embracing an intermediate member flanged to provide a tool operating slide way that opens at one side of said member, a slide reciprocable in said way, plates applied to and fixed rigidly on the opposite sides of said flanged member, with one of said plates interrupted at said way, a cover plate removably attached to said frame over said way and provided with an integral slide operating shaft bearing, another plate fixed to the other side of the frame and formed with an integral shaft bearing that is seated in the openings in frame members and opens to said way, a slide operating shaft mounted in said bearings, and integral overhanging projections on said bearing carrying plates brought together beyond said intermediate member to constitute a bolster support for a coping and notching mechanism.

6. A machine for the purpose set forth comprising a frame embracing an intermediate member flanged to provide a tool operating slide way that opens at one side of said member, a slide reciprocable in said way, plates applied to and fixed rigidly on the opposite sides of said flanged member, with one of said plates interrupted at said way, a cover plate removably attached to said frame over said way, and provided with an integral operating shaft bearing, another plate fixed to the other side of the frame and formed with an integral shaft bearing that is seated in the openings in frame members and opens to said way, and a slide operating shaft mounted in said bearings, said bearings carrying plates having projections that overhang the forward edge of the intermediate frame member and are thickened abreast said edge and provided beyond said edge with integral bolster elements.

7. In a machine for the purpose set forth, a frame embracing side plates that overlap rearwardly on the frame and are provided with overhanging integral extensions to constitute a bolster support for a coping and notching mechanism, a reciprocating slide in said frame carrying a coping and notching blade holder, an operating shaft for said slide, integral, alined bearings on said plates for said shaft, and other cutting blades carried by said slide to coöperate with blades fixed to said frame, the frame being formed at said coöperating blades to provide work clearance openings.

8. In a coping and notching machine, the combination with a reciprocable slide provided at one edge with an integral projection, a coping and notching blade holder formed with a recess, having an overhanging wall, to receive said projection, a locking member insertible between the overhanging portion of said recess and said projection to lock said holder from withdrawal in one plane, and interlocking means on the slide and holder to prevent shifting of the holder in the other plane.

9. In a coping and notching machine, the combination with a reciprocable slide provided with a dovetail projection, a coping and notching blade holder provided with an undercut recess to receive said projection, a locking bar insertible through said recess between one end thereof and the corresponding end of said projection to lock said holder from withdrawal in one plane, and interlocking means on the slide and holder to prevent shifting of the holder in the other plane.

10. In a coping and notching machine, the combination with a reciprocable slide provided at one edge with a lateral projection, a coping and notching tool holder provided with a recess to receive said projection, said projection and the bottom of the recess being provided with alined vertical grooves, a key engaging said grooves to lock the holder from lateral movement and a second locking means for locking the holder to and against withdrawal away from said projection.

In testimony whereof I claim the foregoing as my invention, I hereunto append my signature at Chicago, Illinois, this 17th day of February, 1919.

HANS B. KRAUT.